(12) United States Patent
Hattensperger et al.

(10) Patent No.: US 11,052,585 B2
(45) Date of Patent: Jul. 6, 2021

(54) METHOD FOR PRODUCING A FOAMED DECORABLE SUPPORT PART FOR A MOTOR VEHICLE, SHEET FOR USE IN SUCH A METHOD AND FOAMED DECORABLE SUPPORT PART

(71) Applicant: Bayerische Motoren Werke Aktiengesellschaft, Munich (DE)

(72) Inventors: Michael Hattensperger, Inning am Holz (DE); Roman Lesser, Ergolding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/590,440

(22) Filed: Oct. 2, 2019

(65) Prior Publication Data
US 2020/0031034 A1    Jan. 30, 2020

Related U.S. Application Data

(63) Continuation of application No. PCT/EP2018/057738, filed on Mar. 27, 2018.

(30) Foreign Application Priority Data

Apr. 10, 2017    (DE) .................... 10 2017 206 090.5

(51) Int. Cl.
*B32B 3/00*    (2006.01)
*B29C 45/14*    (2006.01)
(Continued)

(52) U.S. Cl.
CPC .... *B29C 45/14688* (2013.01); *B29C 45/1418* (2013.01); *B29C 45/14811* (2013.01);
(Continued)

(58) Field of Classification Search
CPC ......... B29C 45/14688; B29C 45/14811; B29C 51/16
See application file for complete search history.

(56) References Cited

U.S. PATENT DOCUMENTS 5,938,881 A * 8/1999 Kawata ................. B29C 43/203
156/307.4
7,364,677 B2 * 4/2008 Vadala, Jr. .............. B29C 44/12
264/46.4
(Continued)

FOREIGN PATENT DOCUMENTS

CN        1826226 A     8/2006
CN      101528438 A     9/2009
(Continued)

OTHER PUBLICATIONS

International Search Report (PCT/ISA/210) issued in PCT Application No. PCT/EP2018/057738 dated Jul. 2, 2018 with English translation (four (4) pages).
(Continued)

*Primary Examiner* — Elizabeth E Mulvaney
(74) *Attorney, Agent, or Firm* — Crowell & Moring LLP

(57) ABSTRACT

A method produces a foamed decorable support part for a motor vehicle, wherein a sheet with a base layer, an adhesive layer and a protective layer is laminated in an injection-molding process.

12 Claims, 3 Drawing Sheets

(51) Int. Cl.
*B29C 51/14* (2006.01)
*B29L 31/30* (2006.01)

(52) U.S. Cl.
CPC .... *B29C 51/14* (2013.01); *B29C 2045/14114* (2013.01); *B29L 2031/3041* (2013.01)

(56) References Cited

U.S. PATENT DOCUMENTS

| | | |
|---|---|---|
| 2004/0258888 A1 | 12/2004 | Ludwig et al. |
| 2007/0110905 A1 | 5/2007 | Hintze-Bruening et al. |
| 2008/0145624 A1 | 6/2008 | Weikard et al. |
| 2011/0079933 A1* | 4/2011 | Sheu ................... B29C 37/0032 264/101 |

FOREIGN PATENT DOCUMENTS

| | | |
|---|---|---|
| CN | 101908846 A | 12/2010 |
| CN | 104105585 A | 10/2014 |
| CN | 106232318 A | 12/2016 |
| DE | 35 22 878 A1 | 1/1987 |
| DE | 103 28 046 A1 | 1/2005 |
| DE | 103 35 620 A1 | 3/2005 |
| DE | 10 2006 051 897 A1 | 5/2008 |
| DE | 10 2007 024 529 A1 | 11/2008 |
| DE | 10 2009 042 550 A1 | 4/2010 |
| DE | 10 2011 050 479 A1 | 11/2012 |
| DE | 10 2011 085 412 A1 | 5/2013 |
| EP | 1 439 094 A3 | 6/2005 |
| JP | 63-135215 A | 6/1988 |
| WO | WO 94/03337 A2 | 2/1994 |

OTHER PUBLICATIONS

German-language Written Opinion (PCT/ISA/237) issued in PCT Application No. PCT/EP2018/057738 dated Jul. 2, 2018 (four (4) pages).

German-language Search Report issued in counterpart German Application No. 102017206090.5 dated Mar. 8, 2018 with partial English translation (11 pages).

German-language Third Party Observation issued in European Application No. 18713902.7 dated Feb. 27, 2020 (five (5) pages).

Chinese-language Office Action issued in Chinese Application No. 201880008620.6 dated Sep. 29, 2020 with English translation (17 pages).

* cited by examiner

METHOD FOR PRODUCING A FOAMED DECORABLE SUPPORT PART FOR A MOTOR VEHICLE, SHEET FOR USE IN SUCH A METHOD AND FOAMED DECORABLE SUPPORT PART

CROSS REFERENCE TO RELATED APPLICATIONS

This application is a continuation of PCT International Application No. PCT/EP2018/057738, filed Mar. 27, 2018, which claims priority under 35 U.S.C. § 119 from German Patent Application No. 10 2017 206 090.5, filed Apr. 10, 2017, the entire disclosures of which are herein expressly incorporated by reference.

BACKGROUND AND SUMMARY OF THE INVENTION

The invention relates to a method for producing a foamed decorable support part for a motor vehicle. The invention furthermore relates to a sheet for use in a method of this type. The invention moreover relates to a foamed decorable support part for a motor vehicle.

A known method produces decorative trim elements, for example for doors of motor vehicles, in which a foam material layer which is several millimeters thick and which is connected to an external cloth layer supported by said foam material layer is applied to a support composed of wood fiber material, ABS, or the like. The support is adapted to the desired trim shape and, with the aid of an adhesive that is interposed at least in part regions of the contact zone, is connected under the effect of pressure and heat. Such a method is known from DE 35 22 878 A1, wherein a laminating adhesive that is activatable by HF is incorporated between the support and the foam material layer, and the unit composed of the support as well as the foam material layer having the cloth layer, while impinged with slight pressure, is subsequently exposed to the effect of a high frequency field.

A known method produces an interior specification part for motor vehicles that is configured as a composite component having a dimensionally stable plastics material support and a visible-side décor face which has dissimilar surface properties in three regions. The method comprises a vacuum-forming method part or thermoforming method part, wherein a first blank of a flat décor material is preformed to the shape of the décor face of the first region; an injection-laminating method part or press-laminating method part, wherein a dimensionally stable support part which in a first portion is connected to the preformed blank, in a second portion has a decorative surface which forms the second region of the décor face, in a third portion is provided with a planar recess and along the neighboring peripheral edges between the second portion and the further portions includes in each case one groove in the dimensionally stable support part is generated from plastics material; and a laminating method part in which a second portion of a further flat décor material is disposed and fastened in the planar recess of the dimensionally stable support part. Such a method is known from DE 10 2009 042 550 A1.

A method for producing a vehicle component, in particular a vehicle interior component, having a plurality of layers is known from DE 10 2011 085 412 A1. This method comprises the following steps: applying a hot-melt adhesive which includes a first base polymer having a first melting point and a second base polymer having a second melting point which is higher as compared to the first melting point, to a side of a first layer of the two layers by way of a temperature that is higher than or equal to the second melting point; applying a second layer of the two layers to that side of the first layer that is provided with the hot-melt adhesive; heating the hot-melt adhesive between the first and the second layer in a laminating tool to a temperature that is higher than or equal to the first melting point and lower than the second melting point; and demolding the component from the laminating tool prior to the hot-melt adhesive having completely cooled.

The invention is based on the object of improving a method mentioned at the outset. The invention is moreover based on the object of improving a sheet mentioned at the outset in terms of construction and/or function. The invention is moreover based on the object of improving a support part mentioned at the outset in terms of construction and/or function.

The object is achieved by a method for producing a foamed decorable support part for a motor vehicle, wherein a sheet having a base layer, an adhesive layer, and a protective layer is injection-laminated by an injection-molding method. The object is moreover achieved by a sheet and by a support part, in accordance with the claimed invention.

The method can be used in volume production. The injection-molding method can be an injection-molding integral foam method. The injection-molding integral method can comprise foaming and injection-embossing. The foaming can be chemical foaming and/or physical foaming. The injection-molding method can be carried out with the aid of a molding tool that is capable of being opened and closed.

The adhesive layer can be exposed and/or activated. The protective layer can be stripped from the adhesive layer. The sheet having the base layer, the adhesive layer, and the protective layer can be formed, in particular thermoformed. The base layer having the adhesive layer can be thermoformed in the molding tool. The base layer having the adhesive layer can be thermoformed in the opened molding tool. The base layer having the adhesive layer can be thermoformed with the aid of a heating installation. The base layer having the adhesive layer can be thermoformed in a vacuum-assisted manner.

A plastics material can be injected. A plastics material can be injected conjointly with a propellant. The plastics material and optionally the propellant can be injected into the closed molding tool. The base layer by way of the visible side thereof can bear on the molding tool. A molding cavity can be formed on the side of the adhesive layer. The plastics material and optionally the propellant can be injected into the molding cavity. After the injection, the molding tool can be opened by a foaming stroke so as to enable the plastics material to foam. The molding tool can subsequently be opened in order for the support part to be retrieved.

The sheet can be multi-layered. The sheet can be three-layered. The sheet can have an external layer, an internal layer, and at least one intermediate layer that is disposed between the external layer and the internal layer. The sheet can be flexurally limp. The sheet can be inherently rigid. The base layer can form the external layer. The base layer can have a visible side and a rear side. The adhesive layer can form an intermediate layer. The adhesive layer can be disposed on the rear side of the base layer. The base layer and the adhesive layer can be fixedly connected to one another. The base layer and the adhesive layer can be connected to one another in a materially integral manner. The protective layer can form the internal layer. The protective layer can have a functional side and an external side.

The protective layer by way of the functional side thereof can be disposed on the adhesive layer. The adhesive layer and the protective layer can be releasably connected to one another. The functional side of the protective layer can serve for releasably connecting the protective layer to the adhesive layer. The protective layer can tightly cover the adhesive layer.

The sheet can have a thickness of approx. 100 μm to approx. 400 μm, in particular of approx. 200 μm to approx. 300 μm. The adhesive layer can be capable of being exposed and/or activated by removing the protective layer. The adhesive layer can have a hot-melt adhesive.

The support part can have the sheet and a foam layer or a compact layer. The support part can serve as an instrument panel. The support part can serve as a trim part. The motor vehicle can be a passenger motor vehicle.

In summary, and in other words, a thin-film sheet having an integrated laminating adhesive inter alia results from the invention. In the production of a support, a thin-film sheet having an integrated adhesive layer, for example a hot-melt adhesive, can be processed by the thin-film technique and be injection-laminated in a compact or foamed form. A cover layer, or a protective layer, respectively, can be stripped from the support prior to laminating. No adhesion, or only a slight adhesion, potentially only mechanical interlocking, can exist between the cover layer or protective layer, respectively, and the adhesive layer. The adhesive can be activated by stripping the cover layer or protective layer, respectively, or the adhesive layer can thus be exposed for laminating (applying the décor surface).

Contamination during the production is reduced or avoided by way of the invention. A dedicated activation of the surface, such as a flame treatment, can be dispensed with. An input item such as process input, time input, cost input, maintenance input, cleaning input and/or space input, is reduced.

Other objects, advantages and novel features of the present invention will become apparent from the following detailed description of one or more preferred embodiments when considered in conjunction with the accompanying drawings.

DETAILED DESCRIPTION OF THE DRAWINGS

In order for a foamed decorable support part 100 for a motor vehicle to be produced, a sheet 102 having a base layer, an adhesive layer, and a protective layer is injection-laminated by an injection-molding integral foam method.

The protective layer forms an external layer, or visible side, respectively, of the sheet 102. The base layer forms an internal layer, or rear side, respectively, of the sheet 102. The adhesive layer is disposed between the base layer and the protective layer and forms an intermediate layer of the sheet 102. The base layer and the adhesive layer are fixedly connected to one another in a materially integral manner. The adhesive layer and the protective layer are releasably connected to one another. The sheet has a thickness of 200 μm to approx. 300 μm.

Figure 1:
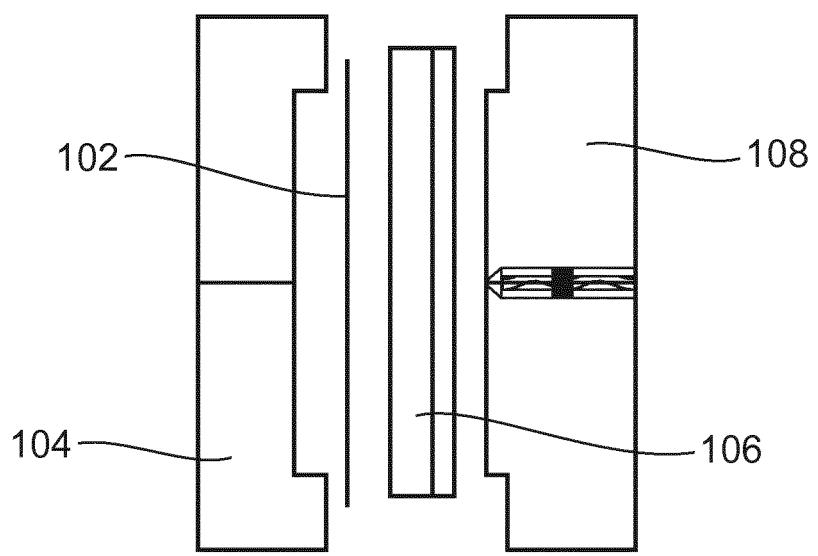
FIG. 1 shows in a schematic and exemplary manner heating of a sheet having a base layer, an adhesive layer, and a protective layer in an opened molding tool.
Figure 2:
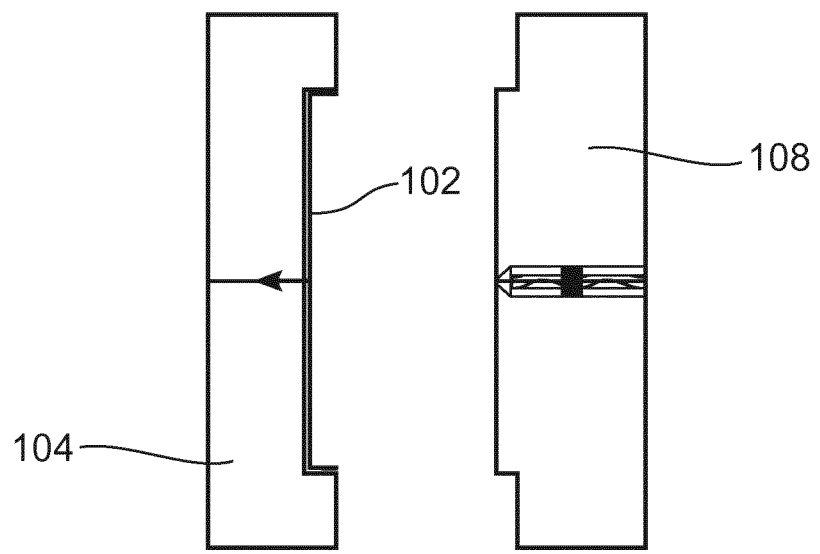
FIG. 2 shows in a schematic and exemplary manner vacuum-supported thermoforming of a heated sheet having a base layer, an adhesive layer, and a protective layer in an opened molding tool.

In order for the support 100 to be produced, the sheet 102 having the base layer, the adhesive layer, and the protective layer, as is illustrated in FIG. 1, is first disposed in an opened molding tool. The protective layer herein faces a molding tool part 104 of the molding tool. The sheet 102 on the side of the base layer, if required, is heated with the aid of a heating installation 106 in order for plastic forming of the sheet 102 to be enabled. The sheet 102 is subsequently thermoformed in a vacuum-assisted manner on the molding tool part 104 of the molding tool, as is illustrated in FIG. 2.

Figure 3:
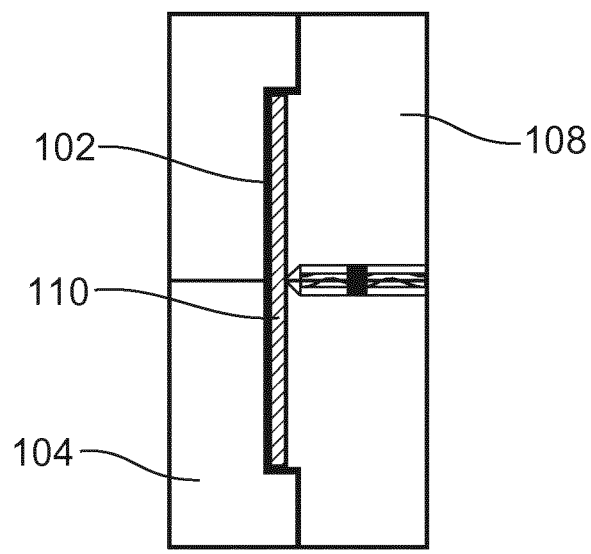
FIG. 3 shows in a schematic and exemplary manner an injection of a plastics material and of a propellant into a molding cavity of a closed molding tool.

The molding tool is subsequently closed. The sheet 102 by way of the protective layer herein bears on the molding tool part 104. A molding cavity 110 is formed between the base layer and a molding tool part 108 of the molding tool. As is illustrated in FIG. 3, a plasticized plastics material, conjointly with a propellant, is injected into the molding cavity 110. The injected plastics material and the base layer of the sheet 102 herein are fixedly connected to one another in a materially integral manner. An at least approximately consistently thick external skin over the support part 100 results after the plastics material has cooled.

Figure 4:
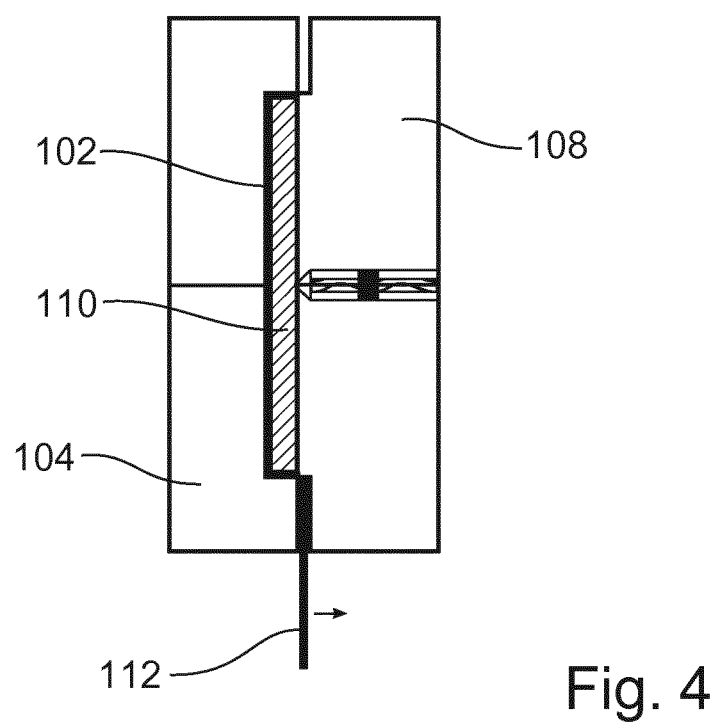
FIG. 4 shows in a schematic and exemplary manner a plastics material being foamed in a molding cavity of a molding tool that has been opened by a foaming stroke.

As is illustrated in FIG. 4, after the injection and the solidification of the external skin, the molding tool is opened by a foaming stroke 112 so as to enable the not yet solidified plastics material to foam in the interior of the support part 100.

Figure 5:
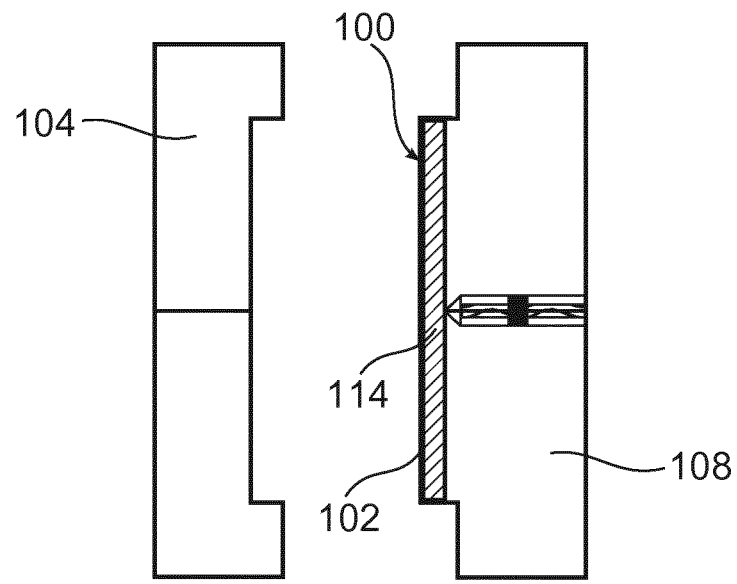
FIG. 5 shows in a schematic and exemplary manner an opened molding tool having a foamed support part having a sheet having a base layer and an adhesive layer on the molding tool.
Figure 6:
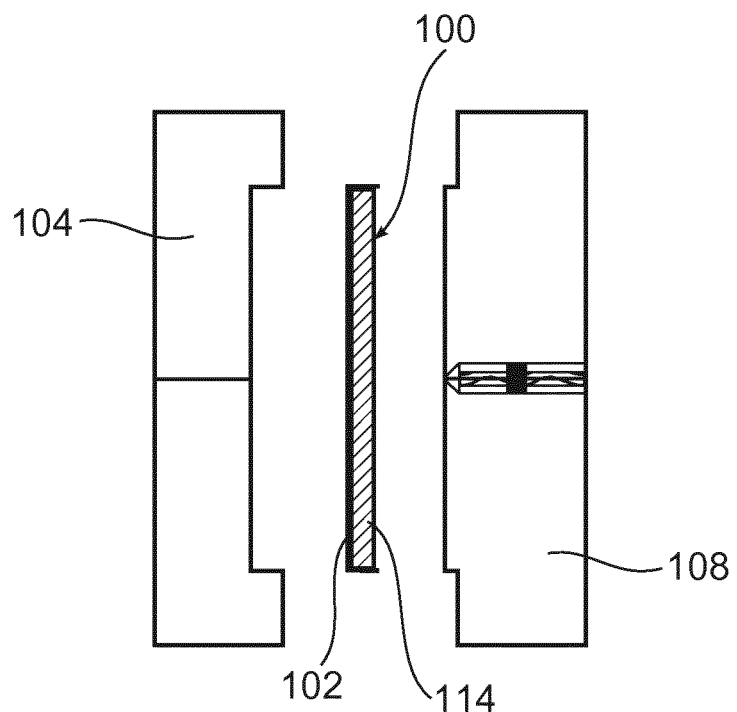
FIG. 6 shows in a schematic and exemplary manner a demolded foamed support part having a sheet having a base layer and an adhesive layer in an opened molding tool.

The molding tool is subsequently completely opened, as is illustrated in FIG. 5, in order for the foamed support part 100 to be retrieved with the sheet 102, as is illustrated in FIG. 6. The foamed support part 100 has a foam body 114 having an external skin and, fixedly connected thereto, the sheet 102 having the base layer, the adhesive layer, and the protective layer.

The protective layer is removed in order for the adhesive layer to be exposed and/or activated. A décor such as leather, artificial leather, or textile material, can subsequently be applied. The exposed and/or activated adhesive layer then effects a materially integral connection between the foamed support part 100 and the décor.

LIST OF REFERENCE SIGNS

100 Support part
102 Sheet
104 Molding tool part
106 Heating field
108 Molding tool part
110 Molding cavity
112 Foaming stroke
114 Foam body The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a foamed decorable support part for a motor vehicle, the method comprising the acts of:
    injection-laminating, via an injection-molding method, a sheet, wherein
    the sheet has a base layer, an adhesive layer, and a protective layer, wherein
    the adhesive layer is disposed between the base layer and the protective layer,
    the adhesive layer and the base layer are fixedly connected to one another, and
    the adhesive layer and the protective layer are releasably connected to one another.

2. The method according to claim 1, further comprising the act of:
    forming the sheet having the base layer, the adhesive layer, and the protective layer.

3. The method according to claim 2, wherein the sheet is thermoformed.

4. The method according to claim 2, further comprising the act of injecting a plastics material.

5. The method according to claim 1, further comprising the act of:
    exposing and/or activating the adhesive layer.

6. The method according to claim 5, wherein the protective layer is stripped from the adhesive layer.

7. A sheet for use in a method for producing a foamed decorable support part for a motor vehicle, comprising:
    a base layer, an adhesive layer, and a protective layer of the sheet, wherein
    the sheet comprising the base layer, the adhesive layer and the protective layer is injection-laminated via an injection-molding method,
    the adhesive layer is disposed between the base layer and the protective layer,
    the adhesive layer and the base layer are fixedly connected to one another, and
    the adhesive layer and the protective layer are releasably connected to one another.

8. The sheet according to claim 7, wherein the sheet has a thickness of approximately 100 μm to approximately 400 μm.

9. The sheet according to claim 7, wherein the sheet has a thickness of approximately 200 μm to approximately 300 μm.

10. The sheet according to claim 7, wherein the adhesive layer is capable of being exposed and/or activated by removing the protective layer.

11. A sheet for use in a method for producing a foamed decorable support part for a motor vehicle, comprising:
    a base layer, an adhesive layer, and a protective layer of the sheet, wherein
    the sheet comprising the base layer, the adhesive layer and the protective layer is injection-laminated via an injection-molding method, and
    the adhesive layer has a hot-melt adhesive.

12. A foamed decorable support part for a motor vehicle, comprising:
    a support part produced by injection-laminating of a sheet having a base layer, an adhesive layer, and a protective layer via an injection-molding method,
    wherein
    the adhesive layer is disposed between the base layer and the protective layer,
    the adhesive layer and the base layer are fixedly connected to one another, and
    the adhesive layer and the protective layer are releasably connected to one another.

* * * * *